US012613132B2

(12) United States Patent     (10) Patent No.:   US 12,613,132 B2

Leisso     (45) Date of Patent:     Apr. 28, 2026

(54) SYSTEMS AND METHODS OF SENSOR CALIBRATION USING SWITCHABLE IN-PATH OPTICAL DIFFUSER

(71) Applicant: BAE SYSTEMS SPACE & MISSION SYSTEMS INC., Broomfield, CO (US)

(72) Inventor: Nathan Leisso, Lafayette, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 261 days.

(21) Appl. No.: 17/874,626

(22) Filed: Jul. 27, 2022

(65) Prior Publication Data

US 2023/0034351 A1     Feb. 2, 2023

Related U.S. Application Data

(60) Provisional application No. 63/227,843, filed on Jul. 30, 2021.

(51) Int. Cl.
    *G01J 1/02*        (2006.01)
    *G01J 1/04*        (2006.01)
    *G02F 1/137*      (2006.01)

(52) U.S. Cl.
    CPC ........... *G01J 1/0295* (2013.01); *G01J 1/0266* (2013.01); *G01J 1/0411* (2013.01); *G01J 1/0474* (2013.01); *G02F 1/13787* (2021.01)

(58) Field of Classification Search
    CPC .... B64G 1/1021; G01J 1/0266; G01J 1/0295; G01J 1/0411; G01J 1/0474;

(Continued)

(56) References Cited

U.S. PATENT DOCUMENTS

2002/0024621 A1 *   2/2002   Hirakata .............. G09G 3/3648
                                            349/34
2002/0122595 A1 *   9/2002   Crill ...................... G06V 10/92
                                          707/E17.02

(Continued)

FOREIGN PATENT DOCUMENTS

JP        3546855 B2 *   7/2004

OTHER PUBLICATIONS

Grochocki et al., "Stray light test results of Operational Landsat Imager 2 (OLI-2) compared to OLI," Proceedings of SPIE, Reflection, Scattering, and Diffraction from Surfaces VI, vol. 10750, No. 107500E, Sep. 4, 2018, 7 pages.
Kampe et al., "The compact hyperspectral prism spectrometer for sustainable land imaging: enhancing capabilities for land remote sensing," Proceedings of SPIE, Earth Observing Systems XXIV, vol. 11127, No. 1211270W, 15 pages.

(Continued)

*Primary Examiner* — Sunghee Y Gray
(74) *Attorney, Agent, or Firm* — Sheridan Ross P.C.

(57)             ABSTRACT

Systems and methods of calibrating a sensor using an in-path optic capable of remaining in the sensor's optical path of view for both nominal imaging and for solar calibration collects are described. The optic is reversibly switchable between a transparent state and a diffuse state. An electric field aligns a plurality of liquid crystals dispersed in a polymer between two conductive layers is created to enable the transparent state. Incident light is transmitted through the aligned liquid crystals. The electric field between the two conductive layers is removed, misaligning the plurality of liquid crystals dispersed in the polymer between the two conductive layers. Light dispersed by the misaligned liquid crystals is received, and the sensor is calibrated based on the light dispersed by the misaligned liquid crystals.

10 Claims, 6 Drawing Sheets

(58) Field of Classification Search

CPC .............. G02F 1/13306; G02F 1/1334; G02F 1/13787; G02F 2201/38; G02F 2203/48; G02F 2203/69; G03B 7/00

USPC ......................................................... 356/367

See application file for complete search history.

(56) References Cited

U.S. PATENT DOCUMENTS

| 2008/0088932 | A1* | 4/2008 | Cho | ...................... G02B 1/113 |
| | | | | 359/586 |
| 2011/0187984 | A1* | 8/2011 | Letocart | .............. G02F 1/13306 |
| | | | | 349/187 |
| 2018/0321524 | A1* | 11/2018 | Li | ...................... G02F 1/13306 |
| 2020/0333647 | A1* | 10/2020 | Zhou | ..................... G02F 1/1347 |

OTHER PUBLICATIONS

Kampe, "Application of Spaceborne Infrared Atmospheric Sounder for Geosynchronous Earth Orbit (SIRAS-G) technology to future Earth science missions," Proceedings of SPIE, Algorithms and Technologies for Multispectral, Hyperspectral, and Ultraspectral Imagery XIV, vol. 6966, No. 696616, Apr. 2008, 13 pages.

Kampe, "The Compact Hyperspectral Prism Spectrometer: advanced imaging spectrometer for sustainable land imaging," Proceedings of SPIE, Remote Sensing and Modeling of Ecosystems for Sustainability XV, vol. 10767, No. 1076708, Sep. 18, 2018, 17 pages.

Valle et al., "Efficient characterization of imaging spectrometers: application in the LWIR and MWIR," Proceedings of SPIE, Infrared Spaceborne Remote Sensing and Instrumentation XVII, vol. 7453, No. 745301, Sep. 1, 2009, 17 pages.

* cited by examiner

SYSTEMS AND METHODS OF SENSOR CALIBRATION USING SWITCHABLE IN-PATH OPTICAL DIFFUSER

CROSS-REFERENCE TO RELATED APPLICATIONS

This application claims the benefit of U.S. Provisional Patent Application Ser. No. 63/227,843, filed Jul. 30, 2021, the entire disclosure of which is hereby incorporated herein by reference.

FIELD

The present disclosure relates generally to sensors and more particularly to an optical device for use in satellite sensors.

BACKGROUND

A critical component to the utility of data collected by on-orbit Earth-observing satellite sensors is the characterization and calibration of the satellite sensor. Conventional satellite sensors undergo extensive pre-launch characterization and calibration processes and maintain that calibration knowledge through a combination of on-board calibration capabilities (examples include a stimulation source such as an LED or calibration panel such as a solar diffuser) paired with various calibration methods. Conventional methods of on-board calibration add significant complexity and cost to the development and characterization of satellite sensors. In addition, conventional methods of calibrating satellite sensors typically involve the use of a solar diffuser (transmissive or reflective) which requires a mechanism to move the diffuser in and out of the sensor's optical viewing path. Future sensor requirements are expected to drive smaller, lighter, and cheaper sensors that strive to maintain current performance capabilities. As a result, what is needed is a system and method of calibrating satellite sensors with reduced complexity while maintaining the prelaunch characterization of sensors while on orbit.

SUMMARY

The disclosed systems and methods address the above-described need through the use of a mounted in-path optical device capable of reversibly switching between a transparent state and a diffuse state. Such an optic may in some embodiments be permanently mounted in the optical path of a satellite sensor. The system and methods disclosed herein eliminate the need for any mechanism for removing a calibration optic, such as a reflective or transmissive calibration optic, from a sensor's field of view, achieving a reduction in the overall complexity and size of the satellite sensor.

As disclosed herein, an in-path optical device may be capable of serving as one or both of a transparent optic and as a diffuser.

In some embodiments, an optical device may be used as a calibration diffuser capable of remaining in an optical path of a sensor and reversibly switching between a diffuse state, in which the sensor may receive only diffused light, and a transparent state, through which the sensor may view incident light passing transparently through the optical device.

The systems and methods described herein provide a single optic device capable of enabling both nominal imaging and calibration while remaining in the optical path where calibration may refer to calibration, characterization, trending, and/or analyzing a sensor's performance. Calibration as used herein for example may refer to the determination between the output of a sensor (e.g., voltage, current, digital counts, etc.) and units of illumination (e.g., $W/m^2$-sr-nm, etc.). Characterization may refer to analyzing details used as inputs into calibration (e.g., wavelength, non-linearity of the response, field of view, MTF, etc.). Trending may refer, for example, to the change in the characterization and calibration over time. Calibration as described herein may comprise each or any of such aspects and others not listed. In some embodiments, a PDLC device as described herein may be used for trending, characterization, calibration, and/or an analysis of the functioning of a sensor. The systems and methods as described herein enable significant reductions in the size, weight, and complexity of satellite sensors while maintaining current on-orbit calibration capabilities. Further, the optic device described herein eliminates the need for moving parts which saves weight and avoids the risk of malfunction inherent with moving parts.

As described herein, an optic may be an in-path optic capable of remaining in a sensor's optical path of view for both nominal imaging and solar calibration collects. Such an optic may be in some embodiments reversibly switchable between a transparent state and a diffuse state. Using such an optic may result in minimal to no change in optical performance of the optic through use and over time for the transparent and diffuse states. Such an optic may be used in a space environment.

An optic as described herein may be combined with heritage calibration methods (e.g., vicarious calibration, lunar collects, Saharan desert scenes, etc.) to maintain calibration continuity and sensor cross-calibration capability.

The systems and methods described herein remove the need for a mechanism to move a transmissive or reflective calibration diffuser into or out of the sensor's field of view. This enables a reduction in the complexity, size, and volume of a sensor while enabling continued on-orbit calibration.

The systems and methods described herein consist of placing an optic in the sensor's optical path that is able to reversibly switch between a transparent state and a diffuse state. The sensor would conduct nominal imaging through the transparent optic while calibration collects would be conducted with the optic in the diffuse state and illuminated by the sun or other illumination source.

Additional features and advantages of embodiments of the present disclosure will become more readily apparent from the following description, particularly when taken together with the accompanying drawings.

DETAILED DESCRIPTION

Figure 1:
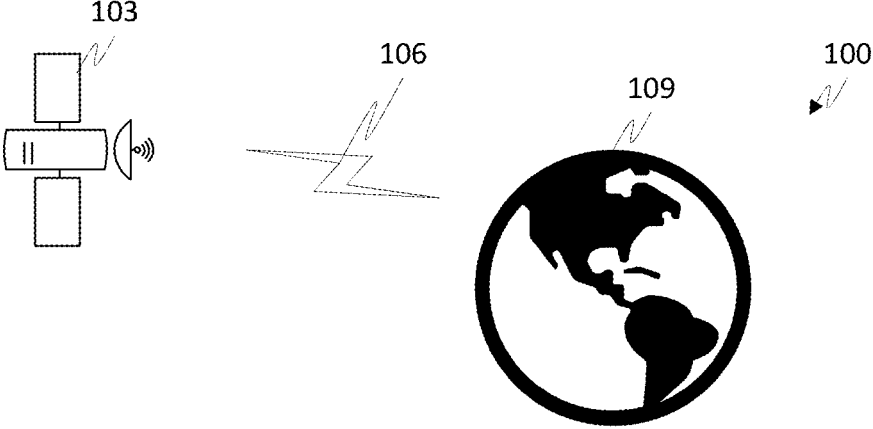
FIG. 1 is an illustration of a satellite in orbit in accordance with one or more of the embodiments described herein.

As discussed above, the systems and methods described herein remove the need for a mechanism to move a transmissive or reflective calibration diffuser into or out of a sensor's field of view, enabling a reduction in the complexity, size, and volume of the sensor while enabling continued on-orbit calibration. As illustrated in FIG. 1, a sensor may be on board a satellite 103 in orbit around the Earth 109 or another object. The sensor may include an optic as described herein and may be configured to collect data by receiving or transmitting data 106 such as light which may be visible light, infrared transmission, and/or ultraviolet energy. The environment 100 shown in FIG. 1 is shown for illustration purposes only and it should be appreciated that the same or similar optic designs may be used in similar sensor devices in other environments.

Figure 2:
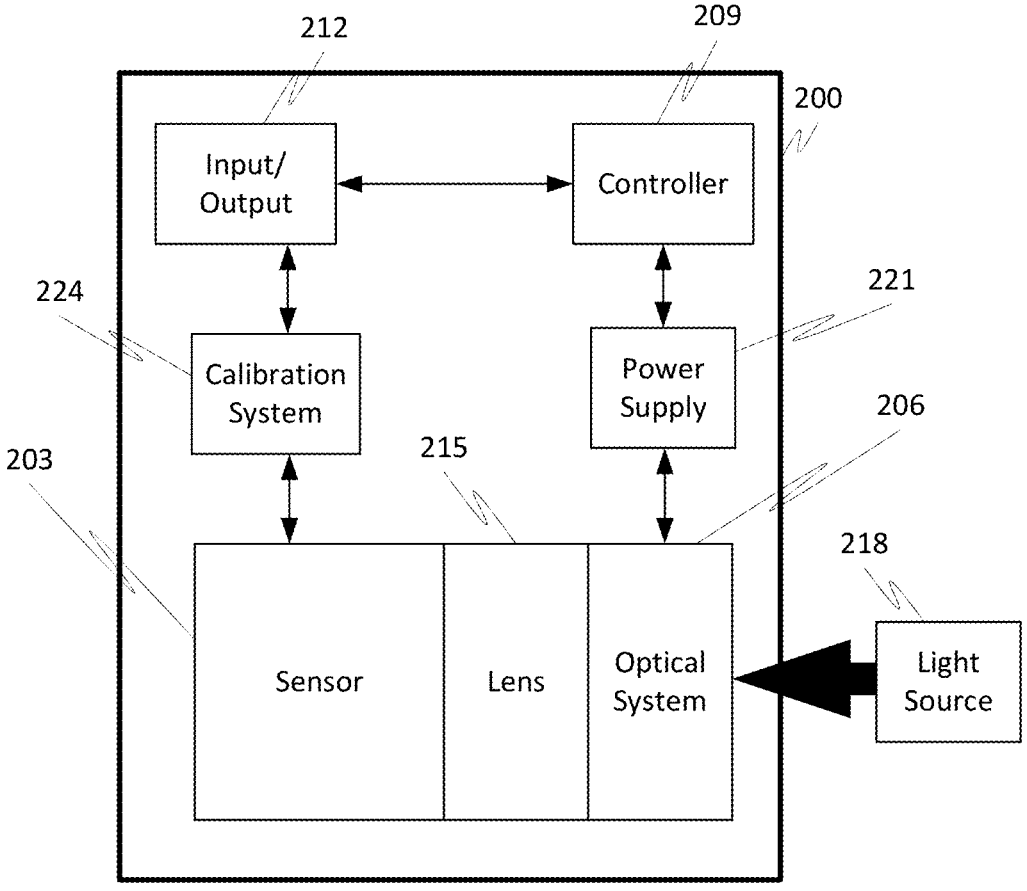
FIG. 2 is a block diagram of a sensor with an optic in accordance with one or more of the embodiments described herein.

On-orbit sensor calibration is often critical to meet mission objectives. Typical calibration sub-systems are large and expensive. Large and expensive systems increase launch costs and spacecraft bus requirements. The systems and methods described herein reduce the size, weight, and costs involved in operating a sensor by providing an optical device enabling the sensor to be calibrated without the use of moving parts. For example, as illustrated in FIG. 2, a sensor device 200 may comprise a sensor 203, such as a photosensor, a focal-plane array detector (FPA), or other sensor type, or some combination thereof, which may comprise or be associated with an optical system 206 as described herein. The optical system 206 may be in a viewing path of the sensor 203 such that light to be captured by the sensor 203 may pass through the optical system 206.

For example, light from a light source 218 may enter the sensor device 200 via a lens 215. In some embodiments, the light gathering part of the sensor device may be referred to as a telescope and may comprise multiple optical elements, including, for example, one or more mirrors and/or one or more lenses. Between the lens 215 and the sensor 203, an optical system 206 may be installed. It should be appreciated that in some embodiments the optical system 206 may be installed on a light-incident surface of the lens 215 as opposed to a sensor-side of the lens 215 or vice versa. While FIG. 2 illustrates the optical system 206 as being between the light source and the lens, and the lens is illustrated as being between the optical system 206 and the sensor 203, it should be appreciated other arrangements may be implemented.

The optical system 206, as described in greater detail may be capable of switching between a transparent or near transparent state and a diffuse state. The optical element includes first and second panels. As used herein, panels may refer to optical windows. In some embodiments, the panels, or optical windows, may comprise optical-grade fused silica windows. However, it should be appreciated that in some embodiments windows of other materials may be used. A Polymer Dispersed Liquid Crystal (PDLC) material is disposed between the first and second panels. The first panel and second panels are selectively connected to a voltage source. For example, the first panel is connected to a first terminal of the voltage source, and the second panel is selectively connected to the second terminal of the voltage source with the voltage application controlled by a switch.

In accordance with embodiments of the present disclosure, the first and second panels are transmissive to light within operating wavelengths of the associated sensor. In the presence of an electrical field applied between the first and second panels, the LC microdroplets are aligned with the electrical field. The LC microdroplets can thus be aligned such that light can be transmitted by the optical element without being altered by that element for an operational mode. In absence of the electric field, the birefringent LC microdroplets may naturally return to a random orientation, diffusing the incident light, allowing a calibration mode as described herein.

A power supply 221, which may be controlled by a controller 209 may be capable of creating an electric field in the optic device 206. When the electric field is created and active in the optic device 206, light received through the lens 215 may pass through the optical system and be received by the sensor 203. The sensor 203 may record image data based on the received light. For example, the sensor 203 may be used to capture an image of a scene from which the light is received.

When the power supply 221 is not creating an electric field in the optical system 206, any light reaching the optical system 206 may be diffused by the liquid crystal microdroplets ("LCs") in a polymer-dispersed liquid crystal ("PDLC") material. The light as diffused by the LC microdroplets may reach the sensor 203. While the diffused light may not be adequate for capturing an image of a scene, the diffused light may be used by the sensor device 200 in that the sensor 203 may be calibrated, for example by a calibration system 224, based on the diffused light as described herein. This may include capturing image data of the diffused light created by the optical device as described herein.

The PDLC material of the optical system 206 may be bracketed by panels, or optical grade windows, coated with a conductive layer. An electric field created by the power supply 221 may be applied across the conductive layers to align the liquid crystal microdroplets in the PDLC material. In some embodiments, a conductive layer may be comprised of indium tin oxide or tin-doped indium oxide, but as should be appreciated other conductive coatings or layers may be used.

The PDLC material consists of liquid crystal microdroplets encased in a polymer matrix. Liquid crystals exist in an intermediate state between a crystal and an isotropic liquid enabling the liquid crystals to form droplets and behave like a liquid while exhibiting the anisotropic behavior of a crystal. The optical anisotropic behavior enables the material to exhibit different optical performance depending on the orientation of the liquid crystals relative to the illumination. The local electrical field aligns the liquid crystal microdroplets and alters the optical performance to switch the PDLC material from a diffuse state to a transparent state.

The optical system 206 may be controlled by a controller device 209 which may be, for example, a computer system comprising one or more processors and memory configured to execute computer-controlled software.

The sensor 203 and controller 209 may be in communication with one or more input and/or output devices 212. For example, a user or a computing device may be enabled to interact with and/or control the sensor 203 and operate the optical device 206 as described herein. For example, sensor data may be collected by a user communicating with the sensor through an input/output device 212. Programs or applications may be created and executed by the controller 209. The input/output devices 212 may be used to install or update programs and/or to otherwise communicate with the controller 209.

The systems and methods described herein eliminate the need for a mechanism to insert and remove an optical diffuser from the optical path and significantly reduce the size of the calibration subsystem. Using an optical system 206 in a device 200 as described herein, a sensor 203 may be used to collect image data of a scene. The light of the scene may travel through the lens 215 and through a transparent or near transparent PDLC material of an optical system 206 which is electrified by a power supply 221 before reaching the sensor 203.

Calibration of sensors is a process which must be performed on a regular basis during use of an image capturing device. To calibrate the sensor 203, the power supply 221 may end the electric field applied to the optical system 206, making the optical system 206 diffuse. When the optical system 206 is diffuse, the light through the lens 215 may be diffused to an extent such that no recognizable image may be captured. In some embodiments, the sensor or a satellite or other system comprising the sensor may be oriented to enable illumination from the Sun or another light source. This diffuse light may be as optimal for calibrating the sensor as would be physically installing a shutter system or other moving calibration component.

Figure 3B:
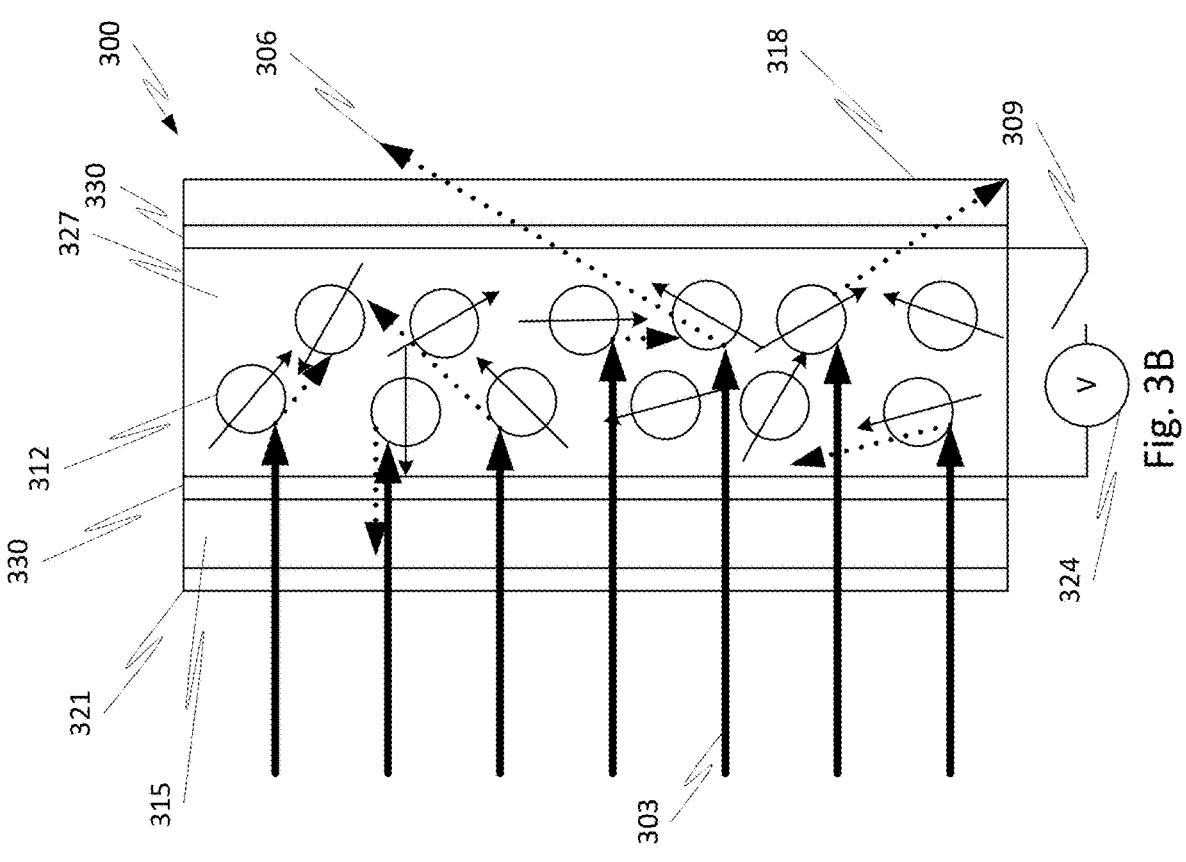
FIGS. 3A and 3B are illustrations of an optical device in a resting state in accordance with one or more of the embodiments described herein.
Figure 3A:
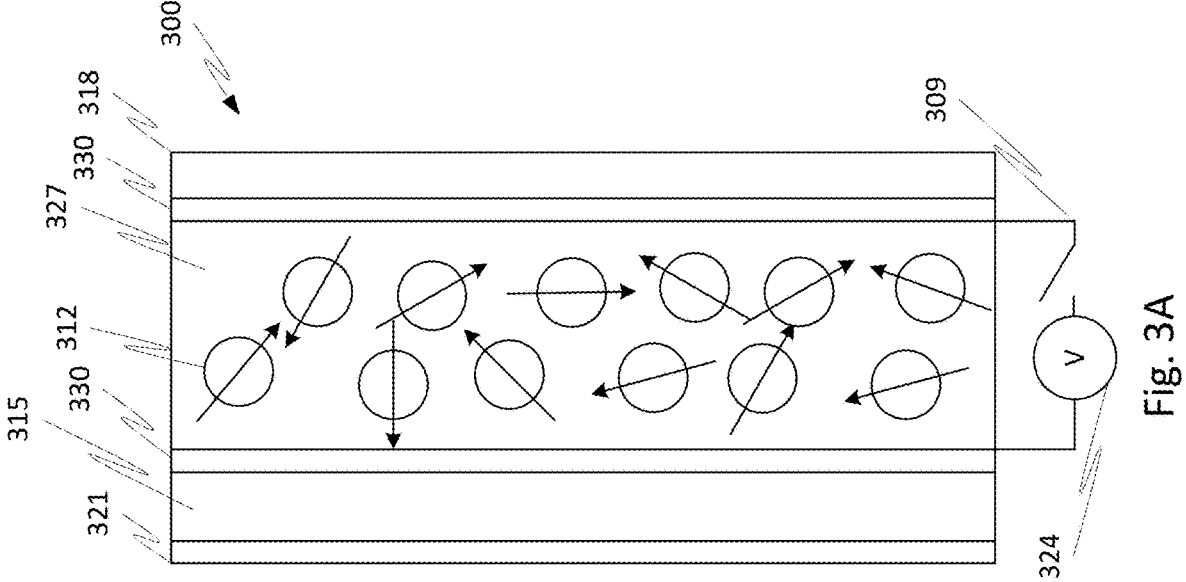

In some embodiments, as illustrated in FIGS. 3A-3D, an optical system 300, which may be in a device 200 such as illustrated in FIG. 2 and as described above, may comprise a PDLC material 327 between two fused silica windows or panels 315, 318 of which the front window (or independent window) may be coated with an anti-reflection (AR) material 321. The AR material 321 may reduce exposure of the optical device to ultra-violet light and minimize the degradation of the PDLC material 327 and the optical system 300 in general while on-orbit. FIG. 3A illustrates an optical system 300 in which no electric field is applied to the PDLC material 327. As can be appreciated by the switch 309, the control of the electric field may be as simple as switching off a power supply 324. When the PDLC material 327 is not affected by an electric field, the LC microdroplets 312 are randomly orientated within the PDLC material 327 and are not aligned. It should be appreciated that each LC microdroplet 312 may comprise a plurality of LC molecules. The LC molecules in each LC microdroplet 312 may or may not display local order within the respective LC microdroplet 312.

As illustrated in FIG. 3B, when incident light 303 enters the optical system 300, the light 303 is dispersed in different directions by each randomly orientated LC microdroplet 312. In this way, the output light 306 of the optical system 300 is dispersed and the optical system 300 is not transparent. In some embodiments, the dispersion of the incident light 303 may be near complete and minimal light may be output from the optical system 300 at all. In other embodiments, the dispersed light may be at a select fraction of the incident light. For example, the optical system 300, when no electric field is applied, may allow less than fifty percent of the light to be transmitted. It should be appreciated that by adjusting qualities of the PDLC and the LCs, particular characteristics may be achieved based on demand of particular embodiments.

The PDLC material 327 may comprise a plurality of liquid crystal (LC) microdroplets 312 dispersed throughout. The LC microdroplets 312 may be anisotropic such that an orientation of the LC microdroplets 312 defines the optical, electrical, magnetic, and mechanical properties of the optic. For example, and as described in greater detail below, when the LC microdroplets 312 are aligned, incident light 303 reaching the PDLC material 327 may pass through the PDLC material 327 to a sensor side of the optical system 300 as if the PDLC material 327 is transparent, while when the LC microdroplets 312 are misaligned, or randomly orientated, the incident light 303 may be dispersed by the LC microdroplets 312 such that a diffuse light appears on the sensor side of the optical system 300.

Without an electric field applied, the Liquid Crystal microdroplets typically contain multiple LC molecules with a localized positional or orientational order. However, individual Liquid Crystal microdroplets are randomly aligned. This results in a high degree of optical scatter and a diffuse optical device. This enables a solar-based calibration of the sensor where the optic is illuminated by the sun or other source in the diffuse state.

To enable nominal imaging, a local alternating electric field is applied to preferentially orientate the LC's optical axis as shown above in FIG. 3C. This reduces the scatter and results in a transparent PDLC optic. The magnitude and frequency of the applied current and resulting electric field is an important aspect of the PDLC design. As an example, in the devices we are testing, the diffuse state may occur without a voltage applied to the PDLC. The voltage frequency may in some embodiments be required to be relatively high, for example, a frequency greater than 10,000 Hz may be used. Similarly, the performance may be dependent on the magnitude of the voltage. The voltage may be, for example, 80 V in the transparent state.

In addition, a broadband anti-reflection coating on the Fused Silica window or an adjacent optic may be utilized to reduce ultra-violet exposure of the polymer. This is expected to reduce polymer degradation and maintain the optical properties of the optic over time in a space environment.

The PDLC material may in some embodiments be bracketed by optically thin layers of a conductive material 330 such as indium tin oxide 330 through which a local electric field may be applied using a switchable power source 324 to preferentially align or orient the LC microdroplets 312. The power source 324 may be, for example, controllably applied through the operation of a switch 309. The switch 309 may be controlled automatically via a controller 209 such as illustrated in FIG. 2.

As illustrated in FIGS. 3A and 3B, without the application of a local electric field to the PDLC material 327 through the application of power to the conductive material 330 bracketing the PDLC material 327, the optic 300 is diffuse. Input or incident light 303 striking the optic 300 may pass into the PDLC material 327, be diffused by the randomly aligned LC microdroplets 312, and be output from the optic 300 as diffuse output light 306.

Figure 3D:
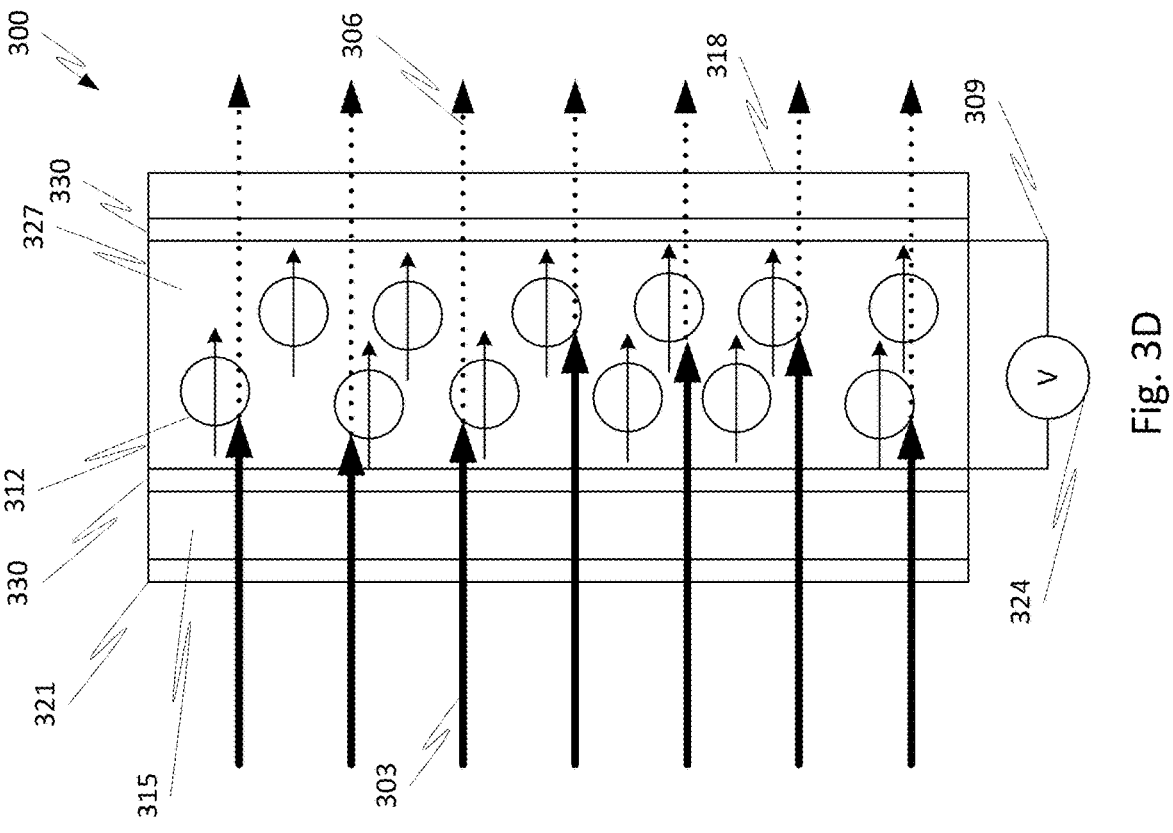
FIGS. 3C and 3D are illustrations of an optical device in a powered state in accordance with one or more of the embodiments described herein.
Figure 3C:
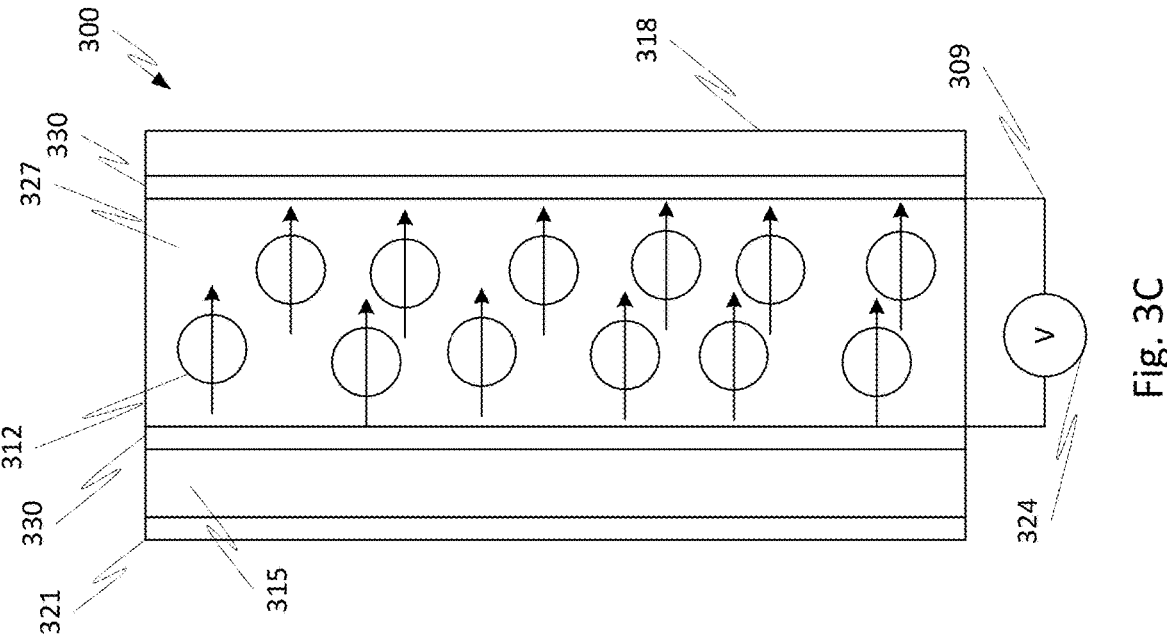

As illustrated in FIGS. 3C and 3D, when an electric field is created and applied to the PDLC 327, the LC microdroplets 312 of the PDLC material 327 are aligned and the optic 300 is rendered transparent such that the incident light 303 passes through the PDLC material 327 and is output relatively unaffected 306 by the LC microdroplets 312.

As illustrated in FIG. 3C, when an electric field is applied across the PDLC material 327, the LC microdroplets 312 align. As illustrated in FIG. 3D, when incident light 303 reaches the optic 300, the light 303 passes through the PDLC material relatively unaffected and is output as output light 306 in a state similar to the state at which the incident light 303 reached the optic 300. While the light 303 is illustrated as reaching the optic 300 in parallel lines, it should be appreciated the light may reach the optic 300 in any direction and may pass through and be output in the same direction.

The process of applying power to the conductive material 330 to create the electric field aligning the LC microdroplets 312 making the optic 300 virtually transparent is quickly reversible and repeatable. As a result, the use of a PDLC optic as described herein enables precise solar diffuser based radiometric calibration while significantly reducing the size and complexity of the sensor.

As described herein, an optic consisting of two fused silica windows with an Anti-Reflection (AR) coating bracketing an optimized PDLC material may be capable of quickly and reversibly switching between an opaque diffuse state and a transparent state through the application of an electric field. As described herein, a PDLC optical device may be a reversible, highly accurate solar diffuser permanently located in the optical path of a future sensor, thereby eliminating the need for a solar calibration diffuser mechanism.

Figure 4A:
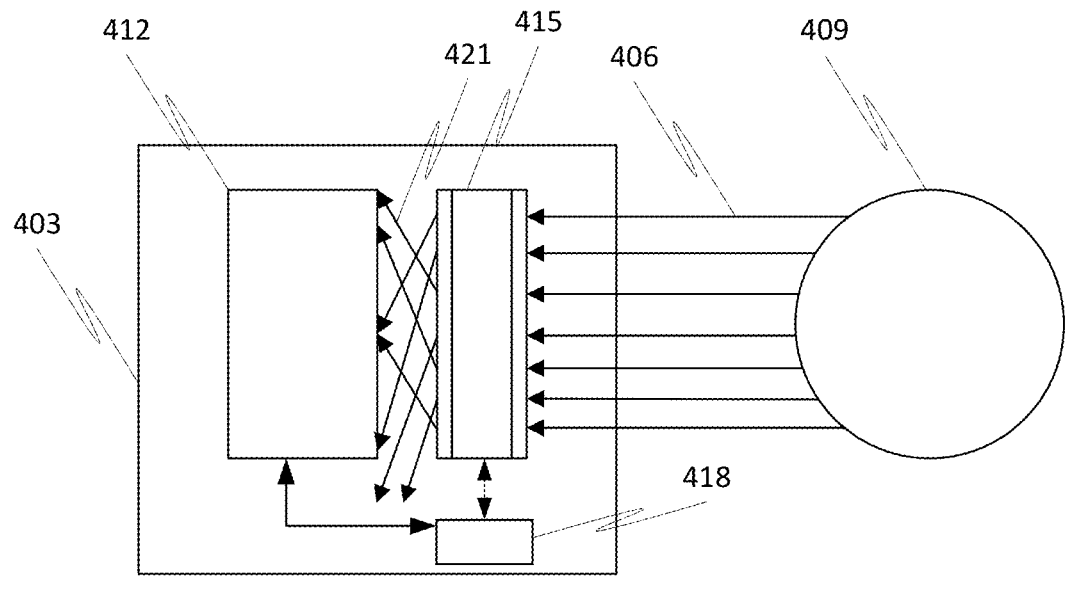
FIGS. 4A and 4B are illustrations of an optical system in accordance with one or more of the embodiments described herein.
Figure 4B:
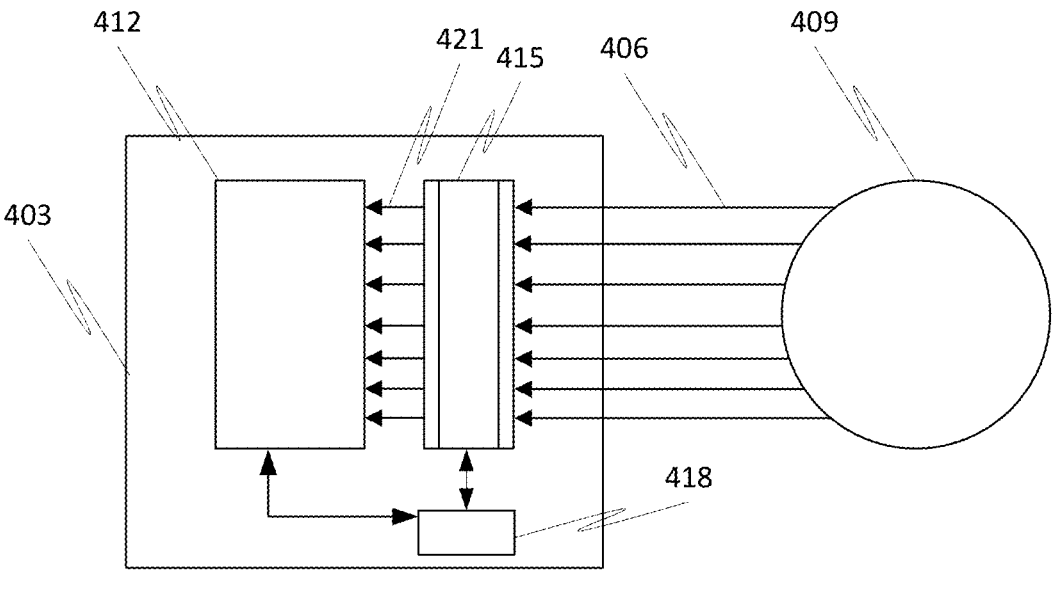

FIGS. 4A and 4B illustrate an optical device 403 in an environment with a light source 409 projecting light 406. It should be appreciated the light source 409 may in some embodiments be an indirect light source in which light reflects before reaching the device 403. For example, the optical device 403 may be capable of capturing an image of an illuminated scene. The light may be visible light or may be light of any wavelength. It should be appreciated the optical device 403 may be capable of sensing any type of light waves.

While the incoming or incident light 406 is shown in parallel lines, it should be appreciated the light may reach the optical device 403 in any direction. When the optic 415 is in a transparent state, the incident light 406 may be output as output light 421 in the same direction as the incident light 406 arrived at the optic 415.

The sensor 412 may be any type of image sensor or photosensor capable of converting received light to data. When the output light 421 is diffused, such as in FIG. 4A, the sensor 412 may receive a diffused light similar to a solid color, such as a flat white background, which may be used for calibrating the sensor 412. When the output light 421 is transmitted through the optic 415 unaffected, the sensor 412 may receive light which may be used to capture an image by the sensor 412. The controller 418 may be capable of controlling the application of an electric field to the PDLC of the optic 415 to switch the optic 415 between the diffuse state and the transparent state.

As described herein, an optimal PDLC material may be designed to reduce scattering and degradation of image clarity in the transparent state and maximize diffuse scattering in the opaque or diffuse state. Characteristics of PDLC materials which may be adjusted to produce an optimal PDLC device include, but are not limited to, the material of the LCs, the droplet size of the LCs, the shape of the LCs, the thickness of the PDLC, and the type of polymer in which the LCs are dispersed. The amount, or ratio, of LC material to the surrounding material may be altered to influence the behavior. In addition, the development temperature may be an important factor in determining the final performance of the optical device. An optimized PDLC material may be selected based on a suite of characterization tests for both the transparent and diffuse states. For example, characterization may include measuring the PDLC spectral transmittance in the diffuse and transparent states, bidirectional transmittance distribution function (BTDF) in the diffuse and transparent states, and the transmitted wavefront. In some embodiments, environmental testing may be conducted on a sensor with a PDLC device or the PDLC device may be tested independently. The temporal stability of the optical PDLC device characteristics may be critical to enable on-orbit sensor calibration and may be determined through extensive testing, using full-spectrum sources (including UV) with interspersed characterization collections to trend the optical behavior of the PDLC. The PDLC material may also be subjected to radiation and environmental testing to verify its applicability for space flight instrumentation. Finally, on-orbit imaging and calibration performance may be modeled and evaluated with an Engineering Design Unit (EDU) or operational sensor. A PDLC calibration optic as described herein may enable significant reduction in size, mass, and cost of calibration subsystems through the removal of the calibration mechanism.

Figures 5, 6:
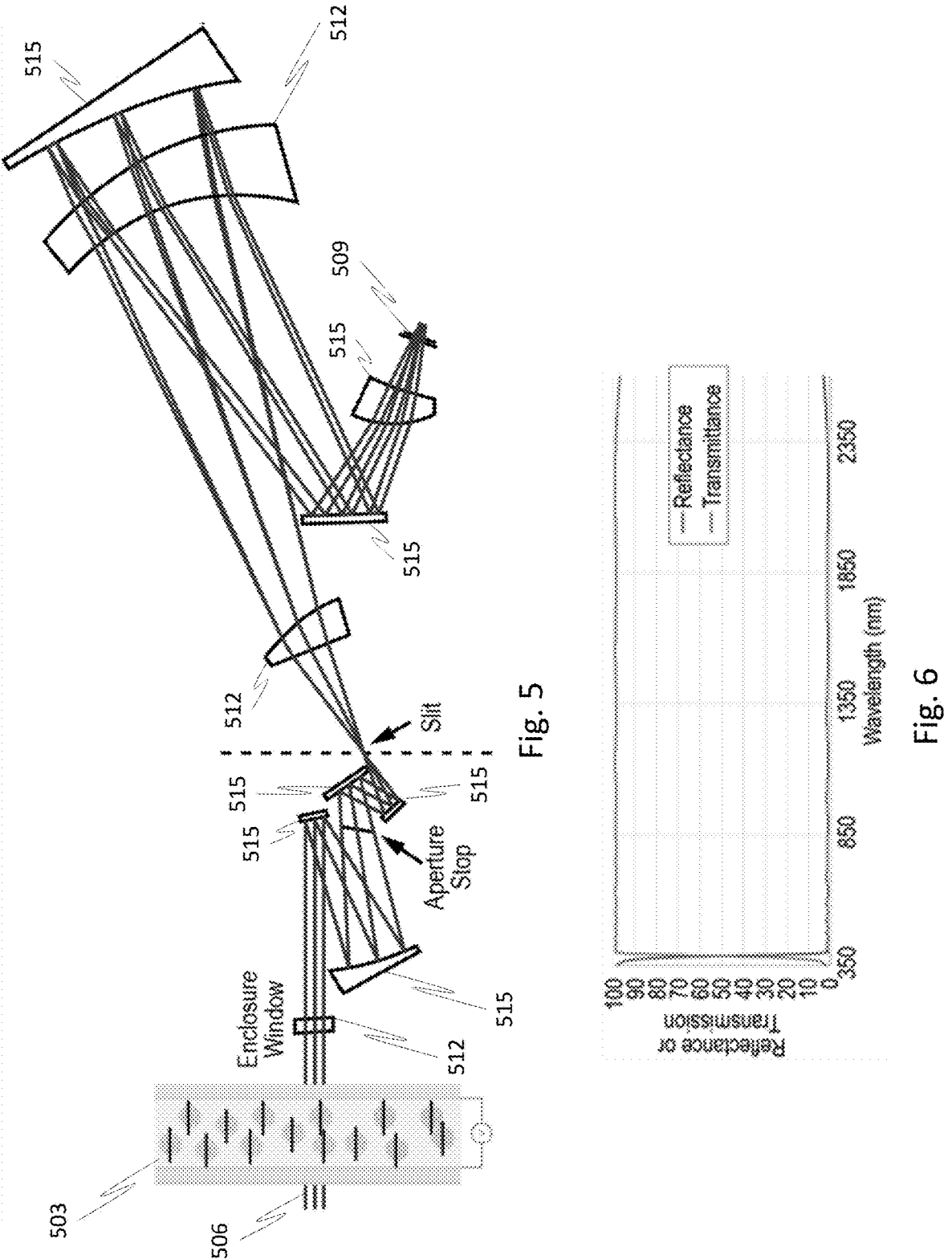
FIG. 5 is an illustration of an optic as described herein installed in the optical path of an example sensor design.
FIG. 6 is a graph showing reflectance and transmittance for an anti-reflection material in accordance with one or more of the embodiments described herein.

An optic as described herein may be used in relation to an example sensor as illustrated in FIG. 5 in which an optic 503 may be controlled to preferentially pass light 506 into the sensor under test in either an unaffected state or in a diffused state. While the optic 503 is illustrated in FIG. 5 as being the first optical element of the sensor, it should be appreciated the optic 503 may in some embodiments be placed at any point in the path of light through the sensor in question. As illustrated in FIG. 5, an optical device including an optic 503 as described herein may include a variety of transparent elements 512, such as lenses, and reflective devices 515, such as mirrors. A sensor 509 may be used to collect light output by the optic 503.

The LCs viscosity may be controlled through controlled parameters during the LC mixture development. In principle, multiple types of LCs may be used provided they are chemically compatible with each other and polymer. The LCs typically exist in the intermediate phase between −30° C. to until 60° C. At higher temperatures above about 70° C., the LCs phase changes to a liquid, and the PDLC optic clears regardless of the applied electric field. Thus, the precise operating range depends on the specific LC and Polymer selected, but PDLCs typically are able to operate in an extended range around ambient temperatures.

PDLCs require an application of an electric or magnetic field to preferentially orientate the optical axis of the LCs to achieve the transparent state. To accomplish this, the PDLC material may be flanked by thin conductive layers, for example Indium Tin Oxide (ITO). This enables the application of a local alternating electric field between the ITO layers and preferentially orientating the LC molecules across all microdroplets. This alters the optical properties due to the birefringent nature of the LCs within the PDLC material, reducing the optical scattering and rendering the PDLC material transparent. The frequency of the AC current and resulting electric field is important. If the frequency is too slow, the LC molecules will follow the reversing electric field. If it is too fast, the LCs do not have time to react and LCs does not orientate as efficiently.

The electro-optical properties of the PDLC material are typically defined by the LC composition and proportion, concentration, shape and arrangement, droplet separation and size, and film thickness in conjunction with the polymer. The PDLC configuration is further dependent on the polymerization curing temperature. PDLC film thickness naturally requires a corresponding change in the electric field (typically higher voltages for thicker PDLC material) to ensure the LCs are preferentially aligned. Thus, the PDLC material and the electric field must be optimized together.

An optic as described herein may include an anti-reflection (AR) coating to optimize transmission. In some embodiments, a broadband AR (BBAR) coating with excellent transmission across the solar reflective with a sharp cutoff at shorter wavelengths may be used. Such a BBAR coating may also limit transmitted UV light. For example, and as illustrated in FIG. 6, a BBAR coating may be configured to have around 100% transmittance at wavelengths around or greater than 400 nm and a reflectance of around 100% at wavelengths around or less than 350 nm. The sharp shortwave cutoff may be adjusted to longer wavelengths (400 nm) to reduce transmitted UV light. An AR coating as described herein may reduce the UV induced aging of the PDLC material and extend the nominal lifetime.

UV-B classified radiation (280 to 315 nm) has energies of 426 to 380 kJ mol$^{-1}$. The shorter wavelengths (and higher energies) are typically absorbed in the earth's atmosphere. This is not true for a sensor conducting solar-based calibration collects on orbit. UV-A classified radiation (315 to 400-nm) has energies of 389 to 300 kJ mol$^{-1}$. These wavelengths are typically less harmful to organics than the shorter wavelengths. Nevertheless, most earth observing measurements (excepting atmospheric measurements such as ozone) are conducted at wavelengths greater than 400 nm. For example, the shortest spectral band of the Operational Land Imager is the Coastal Aerosol band centered at about 440 nm, making 400 nm a natural cutoff for a BBAR coating to maintain the desired imaging capabilities while limiting the UV light-induced degradation.

An optic utilized for solar calibration in the diffuse state must also have minimum impact on the transmitted optical wavefront in the transparent state. This is needed to minimize the degradation of the optical point-spread function (PSF) and the resulting image. The selection of the LC and polymer of the PDLC may be completed in parallel to ensure an optical match, based on index of refraction and CTE for example, and chemical compatibility.

An optic for solar calibration diffusion may also be required to maintain optical characteristics over time. Such a requirement may require the PDLC material to be stable on-orbit and resistant to UV light. UV light typically causes photooxidative degradation and the production of free radicals. The optics as described herein address this issue in two manners. First, UV-light incident on the PDLC may be dramatically reduced through the use of BBAR coating. Second, the selection of a polymer type and the optional inclusion of scrubbers (or photo stabilizers) to bind free radicals resulting from photooxidative degradation to reduce any UV induced aging or yellowing of the PDLC optic.

An optic for solar calibration diffusion must also perform well as a solar diffuser over an operating range of 400 nm to 2500 nm. To enable this, the optimal determination of the LC type and droplet size in the polymer matrix will be a focus of the development with optical comparison testing conducted to verify performance.

In some embodiments, the PDLC liquid crystals may require AC current to preferentially orientate the LCs. While DC current is often used for general satellite operation, it may not be feasible for use with an optic as described herein. Continued application of DC current may eventually result in destruction of the LC. LCs may in some embodiments require AC voltages of greater than 50 V at currents in the mA range for efficient operation. The optimal voltage and frequency of the AC may be optimized to the final polymer and LC configuration. If the AC frequency is too low, an LC director may follow the reversing AC current and reduce the transparency of the PDLC material. If the AC frequency is too high, the LC may not fully react, leaving the optic with increased scatter and only partially transparent. The PDLC electrical subsystem must also be compatible with nominal sensor operations. Electronic noise from the calibration subsystem must not be introduced to the sensor above appreciable levels and the total power requirements be within typical allocations.

An optic device as described herein offers significant advantages over previous transmissive or reflective solar diffusers. The elimination of a mechanism significantly reduces the size and mass of the calibration subsystem. For example, a conventional solar diffuser calibration mechanism may encompass a volume of almost fifteen cubic feet. The required precision and complexity of such a conventional calibration mechanism results in significant program costs to develop and test.

Traditional transmissive solar diffusers are significantly smaller than reflective diffusers but may require precise positioning to achieve repeatable calibration results on a per-pixel basis depending on the type of transmissive diffuser. Regardless, the costs, development time, and characterization effort remain high for transmissive diffusers placed in a mechanism.

The use of an optic device as described herein also reduces the risk of a potential failure with the removal of the solar diffuser calibration mechanism.

The removal of the solar diffuser subsystem results in a significantly lighter calibration subsystem. Conventional calibration subsystems may weigh up to 30 kg, excluding the drive electronics which control the mechanism. An optical device as described herein is much lighter, reducing the overall costs of the mission.

The transition of the PDLC as described herein from the diffuse opaque state to clear imaging typically occurs in milliseconds but may be configured for a longer or shorter transition between the diffuse and transparent states. The application of the electrical field required to clear the optic does not induce any wear on the LCs. As such, calibration collects may be conducted as often as desired in balance with requirements for direct solar exposure of the device.

As described herein, a PDLC optic device may eliminate the need for a large, complicated, and expensive solar diffuser calibration mechanism.

The optic in some embodiments may comprise a PDLC material bracketed by optical windows coated with a conductive layer by which to apply a local electric field to align the liquid crystals of the PDLC material. In some embodiments, a broadband anti-reflection coating may be utilized to reduce ultra-violet exposure and reduce polymer degradation.

In some embodiments, an optic as described herein may be mounted in an optical path of a sensor. Such a mounting may be permanent. When mounted in an optical path of a sensor, the sensor may continually view either the optic in the diffuse state or through the optic in the transparent state.

Figure 7:
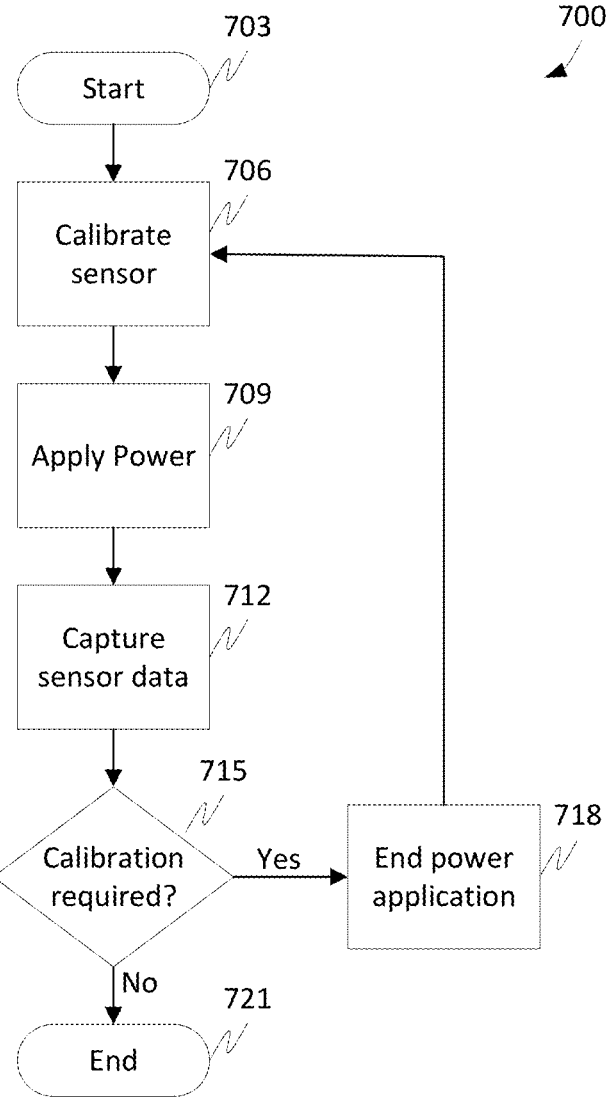
FIG. 7 is a flowchart of a method in accordance with one or more of the embodiments described herein.

In some embodiments, an optic as described herein may be used to execute a process or method 700 of calibrating a sensor and using the sensor to collect data as illustrated in FIG. 7. A nominal use cycle of an optic as described herein may begin at 703 with the PDLC optic in a resting state without a local electric field applied to the PDLC. The PDLC optic in this state is diffuse. Light reaching the optic may be diffused before reaching the sensor.

In the diffuse state, at 706, the sensor may be calibrated. In some embodiments, the sensor may be on a moveable device such as a spacecraft. The sensor, spacecraft, or other device may be moved into a position such that the sun or another light source is illuminating the optic. The sensor may capture an image data of the illuminated optic using the diffused light passing through the PDLC. The captured image data may be used to characterize the performance of and/or calibrate the sensor at 706. By ceasing to apply power to the PDLC, the sensor may be presented with a spatially uniform scatter pattern where light is scattered in all directions. The performance may in some embodiments be dependent on the angle of incidence of the illumination. As such, the control of the illumination and viewing angle to enable illumination at the desired angle may be important.

After calibrating the sensor, a local alternating electrical field may be applied to the optic, aligning the LCs, and resulting in a transparent optic at 709. The optic may take a short amount of time to stabilize prior to beginning nominal image collects. The optic remains in this state while the sensor conducts nominal imaging at 712. The sensor may operate as normal while the electric field is applied to the optic.

In some embodiments, calibration of the sensor may be performed on a scheduled basis, such as on an interval or according to a schedule and upon user command. In some embodiments, the sensor may be calibrated when an error state is detected according to one or more factors, or when image quality appears to be degraded. In some embodiments, calibration may be performed upon a user request, such as via an input device such as illustrated in FIG. 2. A determination may be made at 715 whether calibration is required. Determining calibration is required may comprise determining calibration should be performed in response to a schedule or timer, to a user command, or to image quality for example. If calibration is required, power may cease to be applied to the optic at 718 and the method 700 may return to 706 and the sensor may be calibrated. If calibration is not required, the method 700 may end at 721, the local electrical field is removed, and the optic returns to the diffuse state where a calibration collection may be repeated. The calibration and nominal imaging cycle may be repeated as desired based on the characterization and calibration needs of the sensor. Embodiments of the present disclosure include a system for controlling light at a sensor, the system comprising: a plurality of liquid crystals dispersed in a polymer between two conductive layers; and a switchable power supply connected to the two conductive layers, wherein: in a first state an electric field is created between the two conductive layers by the switchable power supply, the electric field aligns the liquid crystals in the polymer, and incident light is transmitted through the aligned liquid crystals to the sensor, and in a second state no electric field is created between the two conductive layers, the liquid crystals are misaligned, or randomly orientated in the polymer, and the sensor receives light diffused by the liquid crystals.

Aspects of the above system include wherein the liquid crystals are liquid crystal microdroplets.

Aspects of the above system include the system further comprising a first fused silica, or other optical material, panel on a light-receiving side of one of the two conductive layers and a second fused silica panel, or other optical material, on a sensor-side of the other of the two conductive layers. It should be appreciated that an optic comprising a material other than fused silica may be used in some situations.

Aspects of the above system include the system further comprising an anti-reflection coating on exterior side of the optical device for one or both of the first and second fused silica panels.

Aspects of the above system include wherein the anti-reflection coating is a broadband anti-reflection coating.

Aspects of the above system include wherein the conductive layers comprise indium tin oxide or another conductive material.

Aspects of the above system include wherein in the first state image data is generated using the sensor based on the transmitted incident light.

Aspects of the above system include wherein in the second state the sensor is calibrated.

Embodiments include an imaging system, comprising: a sensor; a plurality of liquid crystals dispersed in a polymer between two conductive layers; and a switchable power supply connected to the two conductive layers, wherein: in a first state an electric field is created between the two conductive layers by the switchable power supply, the electric field aligns the liquid crystals in the polymer, and incident light is transmitted through the aligned liquid crystals to the sensor, and in a second state no electric field is created between the two conductive layers, the liquid crystals are misaligned in the polymer, and the sensor receives light diffused by the liquid crystals.

Aspects of the above imaging system include the imaging system further comprising: a first fused silica panel, or other optical material, on a light-receiving side of one of the two conductive layers; a second fused silica panel, or other optical material, on a sensor-side of the other of the two conductive layers; and an anti-reflection coating on one or both of the first and second fused silica panels, or other optical material.

Aspects of the above imaging system include wherein the anti-reflection coating is a broadband anti-reflection coating.

Aspects of the above imaging system include wherein the conductive layers comprise indium tin oxide or another conductive material.

Aspects of the above imaging system include wherein in the first state image data is generated using the sensor based on the transmitted incident light.

Aspects of the above imaging system include wherein in the second state the sensor is calibrated.

Aspects of the above imaging system include the imaging system further comprising a lens on a light-receiving side or on the transmitted side of the two conductive layers.

Embodiments include a method of calibrating a sensor, the method comprising: creating, with a switchable power supply, an electric field between two conductive layers, wherein the electric field aligns a plurality of liquid crystals dispersed in a polymer between the two conductive layers; receiving, with the sensor, incident light transmitted through the aligned liquid crystals; removing, with the switchable power supply, the electric field between the two conductive layers, wherein the removal of the electric field results in the misalignment of the plurality of liquid crystals dispersed in the polymer between the two conductive layers; receiving, with the sensor, light dispersed by the misaligned liquid crystals; and calibrating the sensor based on the light dispersed by the misaligned liquid crystals.

Aspects of the above method include the incident light passes through a first fused silica, or other optical material, panel on a light-receiving side of one of the two conductive layers; the light transmitted through the aligned liquid crystals passes through a second fused silica panel, or other optical material, on a sensor-side of the other of the two conductive layers; and one or both of the first and second fused silica panels are coated with a broadband anti-reflection coating.

Aspects of the above method include wherein image data is generated using the incident light transmitted through the aligned liquid crystals received by the sensor.

Aspects of the above method include the method further comprising: after calibrating the sensor, recreating, with the switchable power supply, the electric field between the two conductive layers, wherein the electric field aligns the plurality of liquid crystals dispersed in the polymer between the two conductive layers; receiving, with the calibrated sensor, incident light transmitted through the aligned liquid crystals; and capturing an image, with the calibrated sensor, based on the received incident light transmitted through the aligned liquid crystals.

Aspects of the above method include the method further comprising a lens on a light-receiving side or the alternative side of the two conductive layers.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An imaging system, comprising:
a focal plane-array detector;
one or more of a lens and a mirror;
a plurality of liquid crystals dispersed in a polymer between first and second conductive layers;
a first fused silica panel on a side of the first conductive layer;
a second fused silica panel on a side of the second conductive layer;
an anti-reflection coating on one or both of the first and second fused silica panels;
a switchable power supply selectively connected to the first and second conductive layers; and
a controllable switch controlling an application of alternating current (AC) from the switchable power supply to the two conductive layers, wherein AC applied to the first and second conductive layers aligns the liquid crystals and enables light to transparently pass through the liquid crystals, wherein:
when no AC is supplied to the first and second conductive layers, the liquid crystals are misaligned in the polymer, and the focal plane-array detector receives light diffused by the liquid crystals, and
the imaging system is configured to generate image data using the focal plane-array detector based on the light diffused by the liquid crystals and to calibrate the imaging system based on the generated image data in response to a schedule, a timer, or an image quality determination.

2. The imaging system of claim 1, wherein:
when AC is supplied to the two conductive layers, an electric field is created between the two conductive layers, the liquid crystals in the polymer are aligned, and the focal plane-array detector receives incident light transmitted through the aligned liquid crystals.

3. The imaging system of claim 2, wherein an image is acquired based on the incident light transmitted through the aligned liquid crystals.

4. The imaging system of claim 1, wherein the imaging system is calibrated using the image data generated based on the light diffused by the liquid crystals.

5. The imaging system of claim 1,
wherein the anti-reflection coating is on one or both of the first and second fused silica panels.

6. The imaging system of claim 1, wherein the anti-reflection coating is a broadband anti-reflection coating.

7. The imaging system of claim 1, wherein the conductive layers comprise indium tin oxide or another conductive material.

8. The imaging system of claim 1, wherein the calibration is associated with one or more of a current and a voltage.

9. The imaging system of claim 1, wherein light collected by the one or more of the lens or the mirror is passed through the liquid crystals, wherein diffused light is received at the focal plane-array detector when no AC power is supplied to the two conductive layers, and wherein focused light is received at the focal plane-array detector when AC power is supplied to the two conductive layers.

10. The imaging system of claim 1, wherein the liquid crystals and conductive layers are contained within an optical system mounted between a light source and the one or more of the lens and the mirror.

* * * * *